United States Patent [19]

Youens

[11] Patent Number: 5,793,355
[45] Date of Patent: Aug. 11, 1998

[54] PORTABLE COMPUTER WITH INTERCHANGEABLE POINTING DEVICE MODULES

[75] Inventor: John E. Youens, Magnolia, Tex.

[73] Assignee: Compaq Computer Corporation, Houston, Tex.

[21] Appl. No.: 808,005

[22] Filed: Mar. 3, 1997

[51] Int. Cl.$^6$ .......................................... G09G 5/08
[52] U.S. Cl. ...................... 345/157; 345/156; 345/161; 345/163; 361/680
[58] Field of Search .......................... 345/156, 157, 345/161, 163, 167, 168, 169, 901, 145, 173; 361/680–685, 686; 364/709.01, 709.08, 709.09, 709.11; 341/20–22; 74/471 XY

[56] References Cited

U.S. PATENT DOCUMENTS

| | | | |
|---|---|---|---|
| 4,575,591 | 3/1986 | Lugaresi | 200/6 A |
| 5,049,863 | 9/1991 | Oka | 340/710 |
| 5,139,439 | 8/1992 | Shie | 439/359 |
| 5,144,302 | 9/1992 | Carter et al. | 341/20 |
| 5,231,380 | 7/1993 | Logan | 340/706 |
| 5,426,564 | 6/1995 | Hsu | 361/707 |
| 5,546,334 | 8/1996 | Hseih et al. | 364/709.11 |
| 5,615,083 | 3/1997 | Burnett | 361/686 |

*Primary Examiner*—Jeffery A. Hofsass
*Assistant Examiner*—Ashok Mannava
*Attorney, Agent, or Firm*—Konneker & Smith, P.C.

[57] ABSTRACT

A notebook computer is provided with first and second different types of pointing device modules, representatively a pointing stick module and a touchpad module, that may be releasably and interchangeably installed on its base housing portion. Each module, when installed on the base housing, is automatically coupled to cursor control circuitry within the computer. Representatively, a convenient snap-in attachment structure is used to releasably connect each module to the computer base housing, and a removable computer component underlies and assists in supporting the removably installed pointing device module.

39 Claims, 3 Drawing Sheets

PORTABLE COMPUTER WITH INTERCHANGEABLE POINTING DEVICE MODULES

BACKGROUND OF THE INVENTION

1. Field of the Invention

The present invention generally relates to portable computers and, in a preferred embodiment thereof, more particularly relates to a notebook computer having interchangeable pointing device modules, representatively a pointing stick module and a touchpad module.

2. Description of Related Art

Portable computers, such as the increasingly popular notebook computer, typically comprise a base housing on a top side of which a keyboard is mounted, and a lid housing which is pivotally mounted to a rear side edge of the base housing for pivotal movement relative thereto between a generally horizontal storage and transport orientation in which the lid housing is parallel to the top side of the base housing and extends across and covers the keyboard, and an upwardly and rearwardly tilted use orientation in which a display screen on the bottom side of the lid housing faces the user.

A pointing device, such as a pointing stick or touchpad, is typically built into the base housing and is manually operable by a user of the computer to selectively manipulate, via suitable position control circuitry, the location of a cursor on the display screen during use of the computer. It is well known in the computer industry that a large number of portable computer users rather quickly develop a strong preference for a particular type of cursor control structure—such as the pointing stick or touchpad—and simply will not buy a portable computer with another type of pointing device incorporated therein.

With respect to a given computer design, the portable computer manufacturer is thus faced with a difficult production decision with respect to which type of pointing device to incorporate in the computer. Regardless of which pointing device type is selected, the resulting computer will not be purchased by potential customers with a strong preference for another type of pointing device.

It is accordingly an object of the present invention to provide a portable computer design which, from a built-in pointing apparatus standpoint, will not be as susceptible to this marketing limitation.

SUMMARY OF THE INVENTION

In carrying out principles of the present invention, in accordance with a preferred embodiment thereof, electronic apparatus representatively in the form of a portable notebook computer is provided and includes a screen on which a movable image, illustratively a cursor, may be displayed, and a housing structure.

The housing structure has a connection portion operative to releasably and interchangeably support a selectively variable one of a plurality of a different types of pointing device modules each operative by a user of the computer to controllably reposition the cursor on the screen. In this manner a single computer design may be manufactured and easily tailored to the differing built-in pointing device preferences of potential customers.

In a preferred embodiment of the computer the plurality of different types of pointing device modules include (1) a pointing stick module and (2) a touchpad module. Each module representatively has a body portion insertable into an exterior wall cutout area of the housing structure. Projecting outwardly from opposite side edges of the body portion are a spaced pair of mounting pins, and a spaced pair of retractable detent members. Also positioned on the body portion is an electrical connector.

To operatively connect the selected pointing device module to the computer housing, the module is tilted in a first direction and its mounting pins are inserted into a pair of parallel grooves formed in spaced apart wall sections of the cutout area. The module is then inserted into the cutout area and tilted back in the opposite direction in a manner causing the detent members to releasably latch into the grooves, and the module electrical connector to matingly engage an electrical connector mounted in the housing and coupled to the computer's cursor control circuitry.

If the pointing stick module is selected, an upwardly projecting pointing stick member thereon passes upwardly through a circular opening in the top side wall of the housing to operatively position the pointing stick between predetermined keys on the computer's keyboard structure. If the touchpad module is selected a closure plug thereon is received in the housing wall opening to close it off.

After the selected pointing device is operatively attached in the cutout area, another computer component, representatively a hard disk drive tray structure, is inserted into the cutout area in an underlying supporting relationship with the inserted pointing device module. To remove the module, the tray structure is removed, a detent release button on the module is pressed to withdraw its detent members from the cutout area grooves, and the module is then tilted to uncouple its electrical connector from the housing electrical connector, and the module is pulled out of the housing cutout area.

While a pointing stick module and a touchpad module are representatively illustrated for interchangeable and releasably connection to the single computer, other types of pointing device modules, such as for example a trackball module or a receiving module for an infrared mouse, may also be utilized if desired.

DETAILED DESCRIPTION

Figure 1:
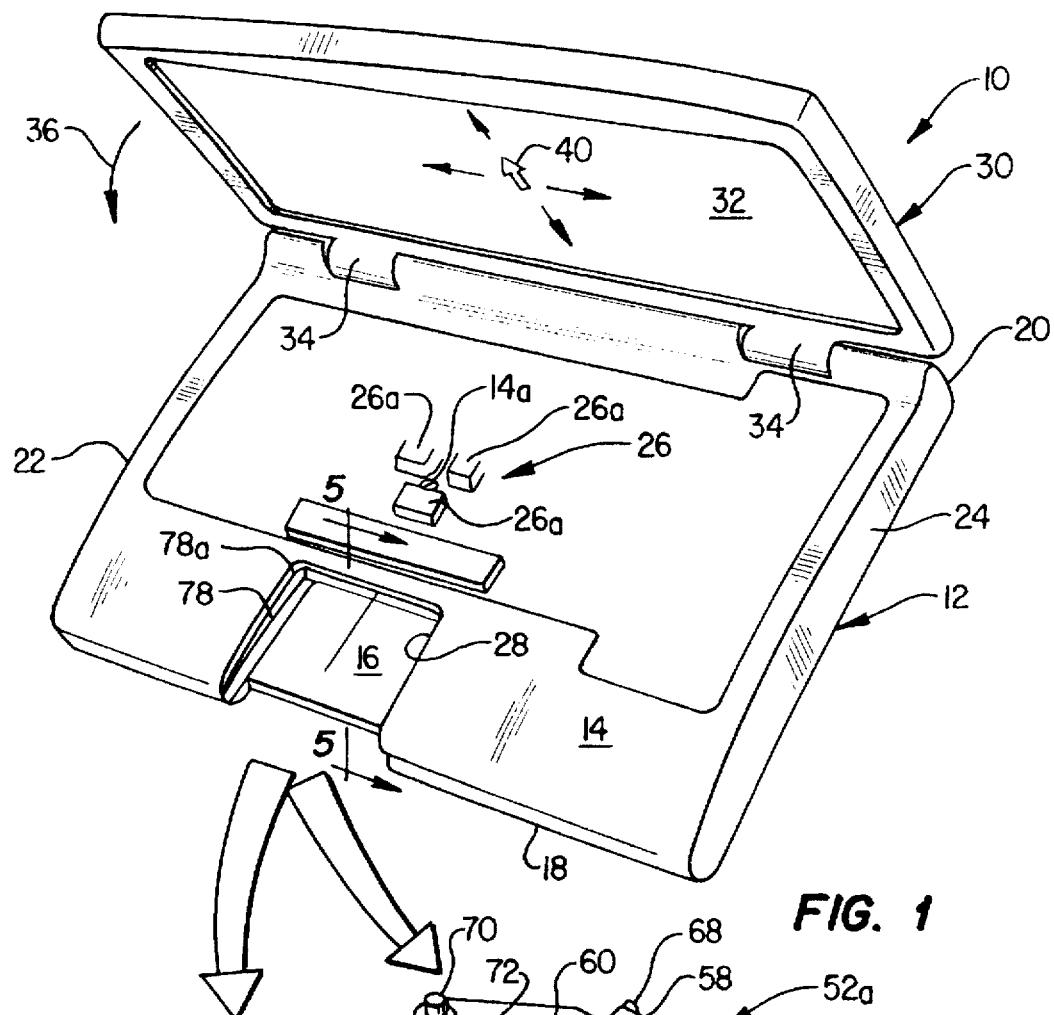
FIG. 1 is a partially exploded perspective view of a notebook computer, in an opened orientation, which embodies principles of the present invention and is adapted to interchangeably receive different types of pointing device modules, a first one of which is shown removed from the computer base housing.

Perspectively illustrated in simplified, partially exploded form in FIG. 1 is a portable notebook computer 10 that embodies principles of the present invention. Computer 10 includes a generally rectangular base housing 12 having top and bottom walls 14 and 16, front and rear side walls 18 and 20, and opposite left and right side walls 22 and 24. A keyboard 26 is operatively mounted on the top wall 14 just rearwardly of a generally rectangular cutout area 28 centrally formed in the top wall 14 between the left and right side walls 22 and 24 and extending downwardly through a front side edge portion of the base housing 12. For purposes later described herein, a circular opening 14a is formed in the top base housing wall 14 in the indicated space between three of the keyboard keys 26a.

A somewhat thinner, generally rectangular lid housing 30 having a display screen 32 extending along its inner side is secured by hinge structures 34 to a top rear side portion of the base housing 12 for pivotal movement relative thereto between an opened use orientation shown in FIG. 11 and a closed storage and transport orientation in which, as indicated by the arrow 36, the lid housing 30 is downwardly pivoted to overlie and cover the keyboard 26. A suitable latch structure (not shown) is provided to releasably retain the lid housing 30 in such closed storage and transport orientation.

Suitable cursor control circuitry 38 (see FIG. 4) is incorporated in the computer 10 and, under user control of unique pointing device apparatus later described herein, is operative to move a displayed cursor icon 40 around the display screen 32. The notebook computer 10 also includes a component, representatively a hard disk drive structure 44, that is removably insertable into a lower side portion of the cutout area 28 as later described herein. Illustratively, the hard disk drive structure 42 includes a tray member 44 having a generally rectangular base wall 46 with an upstanding rear end wall 48, and a hard disk drive unit 50 carried on the base wall 46.

Figure 2:
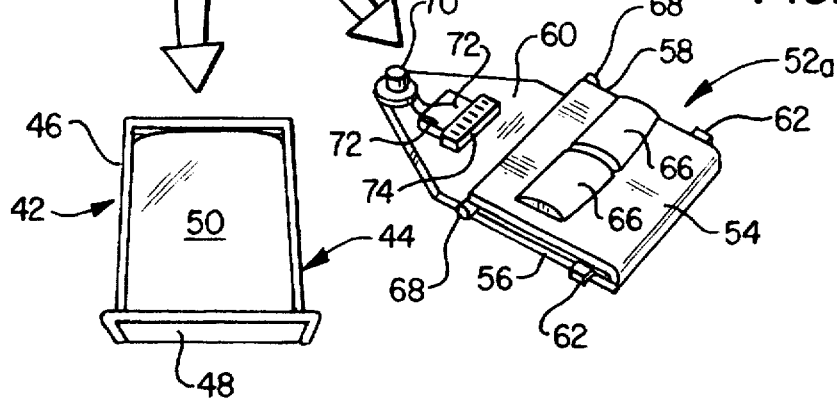
FIG. 2 is a perspective view of a second type of pointing device module which may installed in the computer in place of the pointing device module shown in FIG. 1.
Figure 2:
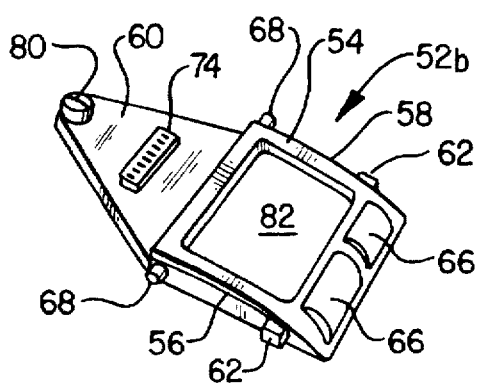

Referring now to FIGS. 1 and 2, according to a key feature of the present invention, the base housing 12 is configured to interchangeably and operatively receive, within its cutout area 28, a selected one of a plurality of pointing device modules—each module having a different type of user operable pointing structure. Representatively, this plurality of interchangeable pointing device modules includes the pointing stick type module 52a shown in FIG. 1 and the touchpad type module 52b shown in FIG. 2. As will be seen, each module, when releasably connected to the base housing 12 is automatically coupled to the cursor control circuitry 38 (see FIG. 4) and is user operable to control the position and movement of the cursor 40.

Pointing stick module 52a (FIG. 1) has a generally rectangular front body portion 54 with opposite left and right side edges 56 and 58, and a somewhat thinner rear section 60. Retractable detent members 62 project outwardly from front portions of the side edges 56,58 and are spring-biased toward their indicated outwardly projecting positions. Detent members 62 may be caused to temporarily retract into their associated body sides 56,58 by manually pushing a release button 64 (see FIG. 5A) recessed into a front bottom side area of the body portion 54.

A pair of spring-loaded pick buttons 66 are mounted on the top of the front body portion 54 generally centrally along its front-to-rear width, and a pair of mounting pins 68 project outwardly from rear portions of the opposite side edges 56 and 58. At the outer end of the rear section 60 is an upwardly projecting pointing stick member 70 which is electrically coupled by wires 72 to an upstanding electrical plug member 74 mounted on the top side of the rear section 60 forwardly of the pointing stick 70.

In a manner subsequently described herein, and schematically illustrated in FIG. 4, the pointing stick 70 is upwardly extendable through the base housing top wall opening 14a, and the plug 74 is removably receivable in a socket 76 carried on the underside of the top base housing wall 14 and electrically coupled to the cursor control circuitry 38. The mounting pins 68 are slidably and removably receivable in an opposing pair of front-to-rear extending horizontal grooves 78 (see FIGS. 1, 3 and 5B) formed in opposing side wall portions of the cutout area 28, with each of the grooves 78 having a rear end 78a (see FIG. 1).

Turning now to FIG. 2, the touchpad module 52b, which is releasably interchangeable with the previously described pointing stick module 52a in the base housing 12, is similar to the module 52a in that it has front and rear body portions 54 and 60; opposite left and right front body portion side edges 56 and 58; detent members 62 and an associated underside release button 64 (see FIG. 5C); mounting pins 68; and an electrical plug 74 on the top side of its rear section 60. However, in the module 52b the pointing stick 70 is eliminated and replaced with a vertically shorter cylindrical closure plug member 80; the pick buttons 66 are moved to the front side of the front body portion 54; and a rectangular touch pad structure 82 is installed on the top side of the front body portion 54 as indicated.

To illustrate how easily and rapidly the two pointing modules 52a and 52b may be interchanged with one another, it will be assumed that the hard disk drive structure 42 has been removed from the base housing 12 (as shown in FIG. 1), and that neither of the pointing device modules 52a,52a is installed in the base housing 12. While other sequences are, of course, possible it will be assumed for purposes of illustration that is desired from this point to (1) operatively install the pointing stick module 52a and then (2) replace the pointing stick module 52a with the touchpad module 52b.

Figure 3:
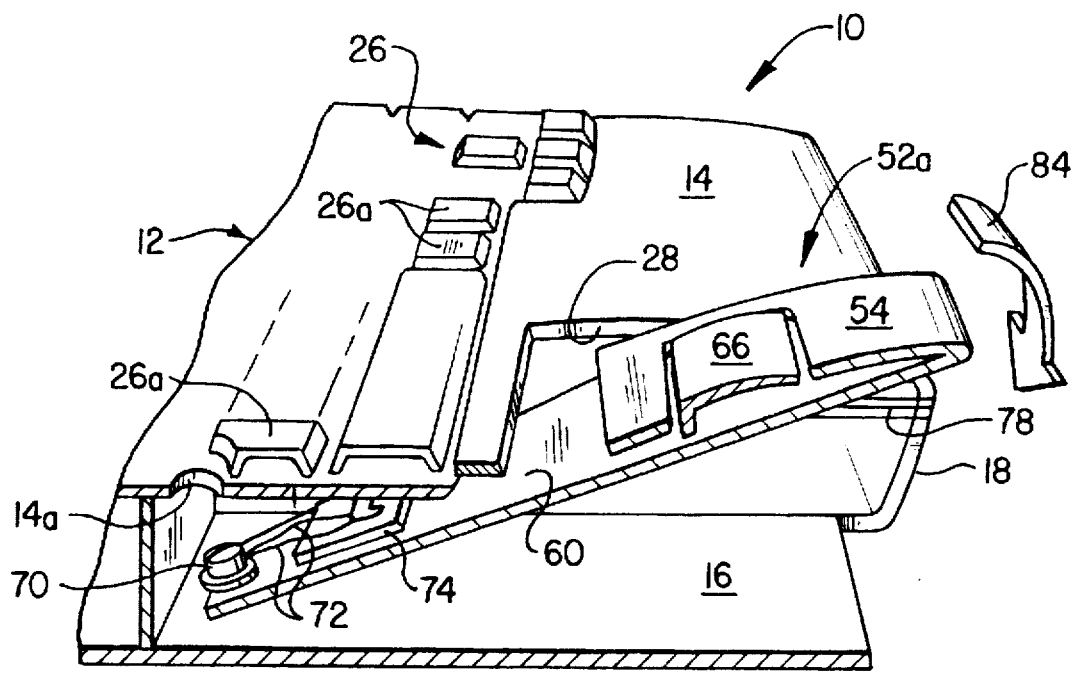
FIG. 3 is an enlarged scale partially cut away perspective view of the base housing portion of the computer and illustrating the operative installation of the first pointing device module therein.

Referring initially to FIG. 3, to install the pointing stick module 52a in the base housing 12, the module 52a is tilted downwardly and rearwardly, and the rear section 60 is inserted into the cutout area 28 in a manner causing the mounting pins 68 (see FIG. 1) to enter front end portions of the grooves 78. The inserted tilted module 52a is then pushed further rearwardly until the pins 68 abut the rear groove ends 78a (see FIG. 1). The module 52a is then pivoted about the pins 68 in a clockwise direction, as indicated by the arrow 84 in FIG. 3, to bring the module 52a to a horizontal orientation and cause the detent members 62 to snap into place in their associated grooves 78. This, in turn, automatically causes the pointing stick 70 to upwardly enter the top base housing wall opening 14a, and the plug 74 to enter the socket 74 (see the dashed arrows in FIG. 4) and bring the module 52a to its installed orientation schematically shown in FIG. 5A. The detent members 62 received in the grooves 78 serve to releasably prevent the installed module 52a from pivoting about its groove-received pins 68.

Figure 4:
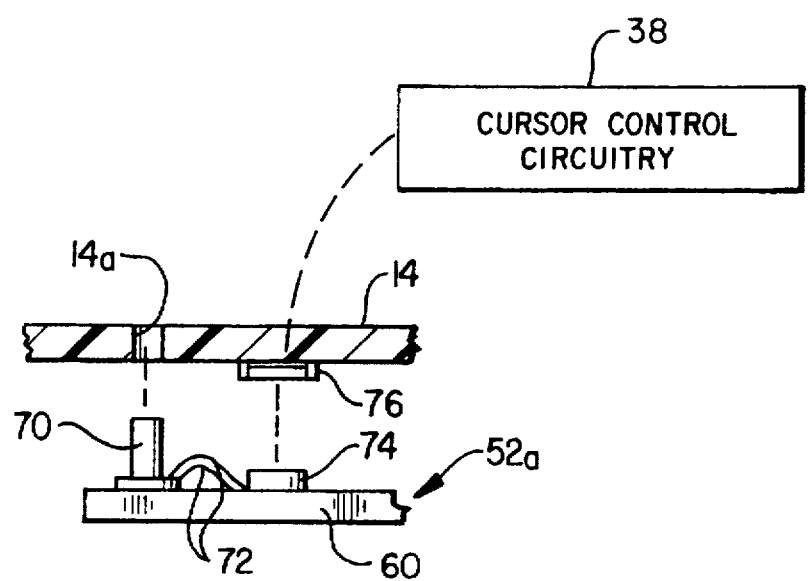
FIG. 4 is a schematic, partially cross-sectional diagram illustrating the electrical coupling of the first pointing device module to the cursor control circuitry of the computer.
Figure 5A:
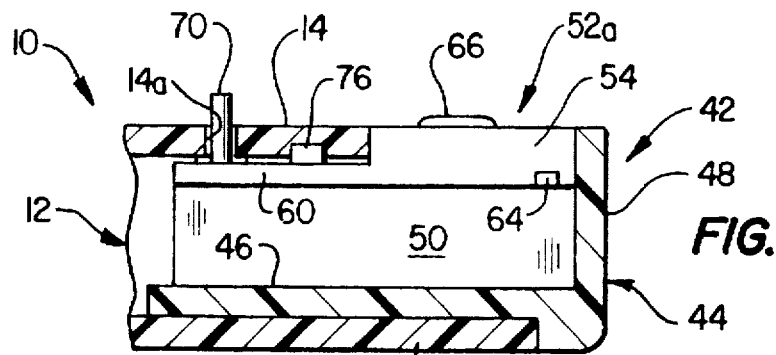
FIGS. 5A–5D are highly schematic cross-sectional views through the portable computer and sequentially illustrate the removal of the first pointing device module from the computer base housing, and the installation of the second pointing device module in place of the removed first module.

With the module 52a in this installed orientation, the pointing stick 70 operatively projects upwardly through the opening 14a beyond the upper side of the top base housing wall 14, and the plug 74 is received in the overlying socket 76, thereby electrically coupling the installed module 52a to the cursor control circuitry 38 (see FIG. 4). Next, the hard disk drive structure 42 is installed by rearwardly inserting the base wall 46 and the disk drive 50 supported thereon into the cutout area 28 beneath the installed module 52a as shown in FIG. 5A. With the hard disk drive structure 42 thus installed, the disk drive 50 underlies and vertically supports the module 52a, with the rear end wall 48 of the tray member 44 neatly closing off the front side of the cutout area 28.

Then, in a conventional manner, a user may selectively position the cursor 40 (see FIG. 1) on the display screen 32 by simply tilting the pointing stick 70 in an appropriate direction. Appropriate circuitry in the module 52a senses the tilt direction and magnitude and, via the interconnected plug 74 and socket 76, transmits the resulting cursor position control signal to the circuitry 38 (see FIG. 4) which, in turn, correspondingly shifts the cursor 40 on the display screen 32. Once the cursor 40 is positioned on the desired location on the screen 32, either or both of the pick buttons 66 may be used to create a desired computer operation associated with the cursor-selected screen area.

Figure 5B:
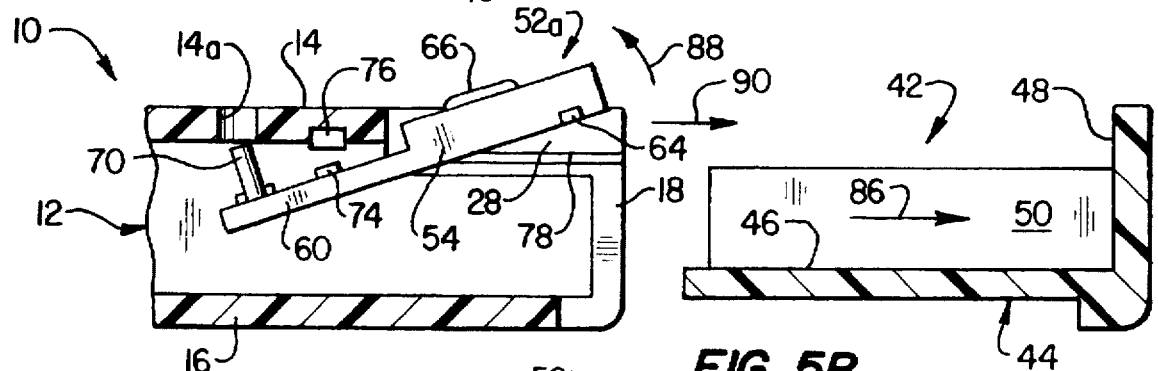

Referring now to FIG. 5B, to remove the module 52a from the base housing 12, the Hard disk drive structure 42 is first removed as indicated by the arrow 86. The release button 64 is then pressed to retract the detent projections 62 (see FIG. 1) and withdraw them from the groove 78, and the module 52a is tilted in a counterclockwise direction about the pins 68, as indicated by the arrow 88 in FIG. 5B, to thereby downwardly withdraw the pointing stick member 70 from the top base housing wall opening 14a and downwardly withdraw the plug 74 from the overlying socket 76. Finally, as indicated by the arrow 90 in FIG. 5B, the tilted module 52a is moved forwardly (i.e., rightwardly in FIG. 5B) to horizontally remove the pins 68 from the groove 78 and withdraw the module 52a from the base housing cutout area 28.

Figure 5C:
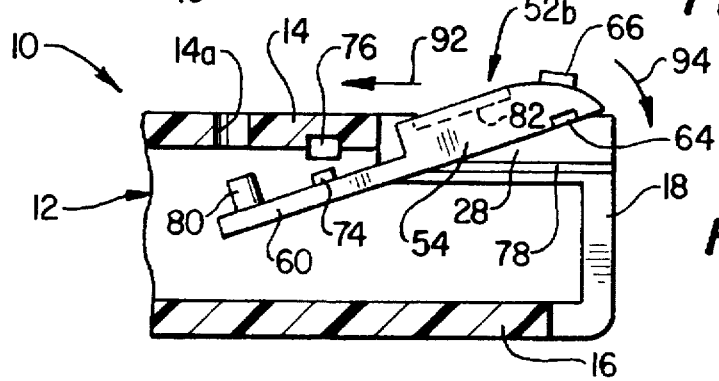

Next, as schematically depicted in FIG. 5C, the module 52b is installed by tilting it downwardly and rearwardly, inserting its pins 68 into the grooves 78, and moving it rearwardly into the cutout area 28 as indicated by the arrow 92 in FIG. 5C. Module 52b is then pivoted in a clockwise direction, as indicated by the arrow 94, to move the module 52b to its FIG. 5D installed position in which its detent members 62 have snapped into the grooves 78, the plug 80 has been moved upwardly into and blocks the wall opening 14a, and the plug 74 has entered the socket 76 to thereby electrically couple the touchpad and pick button circuitry to the cursor control circuitry 38 (FIG. 4).

Figure 5D:
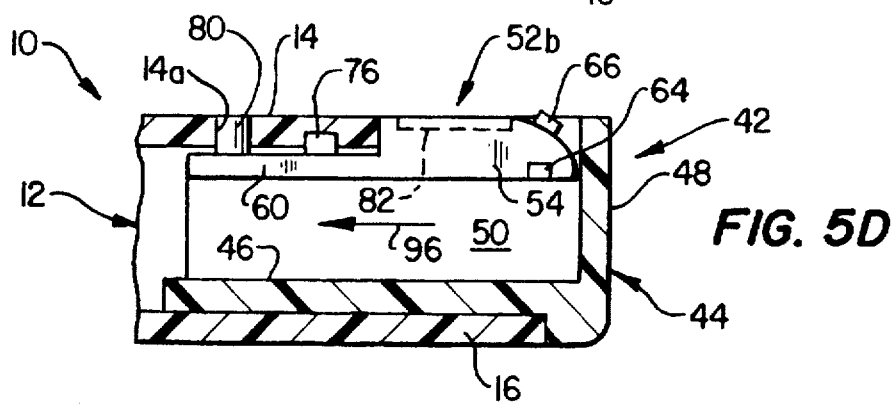

The installation of the touchpad module 52b is completed by re-inserting the hard disk drive structure 42 rearwardly into the cutout area 28 as indicated by the arrow 96 in FIG. 5D, thereby positioning the disk drive 50 in an underlying, supporting relationship with the touchpad module 52b. With the module 52b installed in this manner, a user simply runs his finger along the top side of the touchpad 82 (see FIG. 2) in a direction corresponding to the desired relocation direction for the cursor 40 (FIG. 1), and then uses one or both of the pick buttons 66 to cause the desired computer operation associated with the screen area within which the relocated cursor is positioned.

While unique interchangeability of pointing device modules in the present invention has been illustrated using a pointing stick module and a touchpad module, it will be readily appreciated by those of ordinary skill in this particular art that other types of modules could also be used if desired. For example, a track module could be used in addition to the modules illustrated herein. Additionally, a module could be utilized in which receiving circuitry for a remote infrared mouse was incorporated.

It will also be readily appreciated that other types of module connection techniques can be employed if desired, and that if additional module support from another computer component is desired, the supporting computer component can be a component other than the representatively illustrated hard disk drive structure 42.

The interchangeability of pointing devices provided by the present invention permits a computer manufacturer to advantageously utilize a single portable computer design having a selectively variable pointing device portion to thereby increase the potential market for the computer by essentially eliminating the problem of having, in the view of potential customers having a strong pointing technique preference, the "wrong" type of pointing device incorporated in the computer. Additionally, such interchangeability potentially permits a customer to purchase two or more types of pointing devices for two different users of the computer.

The foregoing detailed description is to be clearly understood as being given by way of illustration and example only, the spirit and scope of the present invention being limited solely by the appended claims.

What is claimed is:

1. Electronic apparatus comprising:

a screen on which a movable image may be displayed; and a housing structure having an externally accessible connection portion operative to releasably and interchangeably support a selectively variable one of a plurality of different types of pointing device modules each operative by a user of said electronic apparatus to controllably reposition the image on said screen.

2. The electronic apparatus of claim 1 wherein said electronic apparatus is a computer.

3. The electronic apparatus of claim 2 wherein said computer is a portable computer.

4. The electronic apparatus of claim 3 wherein said portable computer is a notebook computer.

5. The electronic apparatus of claim 1 wherein said externally accessible connection portion is operative to releasably support a pointing stick module.

6. The electronic apparatus of claim 1 wherein said externally accessible connection portion is operative to releasably support a touchpad module.

7. The electronic apparatus of claim 1 wherein:

the movable image is a cursor, said electronic apparatus further comprises cursor control circuitry, and said externally accessible connection portion is operative to connect the pointing device module which it supports to said cursor control circuitry.

8. The electronic apparatus of claim 1 wherein said externally accessible connection portion is operative to provide a releasable snap-in attachment of the pointing device module that it supports.

9. The electronic apparatus of claim 1 further comprising a plurality of different types of pointing device modules interchangeably supportable by said externally accessible connection portion.

10. The electronic apparatus of claim 9 wherein one of said plurality of different types of pointing device modules is a pointing stick module.

11. The electronic apparatus of claim 9 wherein one of said plurality of different types of pointing device modules is a touchpad module.

12. The electronic apparatus of claim 9 wherein said plurality of different types of pointing device modules include a pointing stick module and a touchpad module.

13. A portable computer comprising:

a base housing;

a lid housing pivotally secured to said base housing and having a screen thereon;

cursor control circuitry; and an externally accessible connection structure associated with said base housing and operative to releasably and interchangeably support thereon, in an operatively coupled relationship with said cursor control circuitry, a selectively variable one of a plurality of different types of pointing device modules each operative by a user of said portable computer to controllably reposition said movable cursor on said screen.

14. The portable computer of claim 13 wherein said portable computer is a notebook computer.

15. The portable computer of claim 13 wherein said externally accessible connection structure is operative to releasably support a pointing stick module.

16. The portable computer of claim 13 wherein said externally accessible connection structure is operative to releasably support a touchpad module.

17. The portable computer of claim 13 wherein said externally accessible connection structure is operative to provide a releasable snap-in attachment of the pointing device module that it supports.

18. The portable computer of claim 13 further comprising a plurality of different types of pointing device modules interchangeably supportable by said externally accessible connection structure.

19. The portable computer of claim 18 wherein one of said plurality of different types of pointing device modules is a pointing stick module.

20. The portable computer of claim 18 wherein one of said plurality of different types of pointing device modules is a touchpad module.

21. The portable computer of claim 18 wherein said plurality of different types of pointing device modules include a pointing stick module and a touchpad module.

22. The portable computer of claim 18 wherein:
each pointing device module has a first electrical connector thereon, and
said externally accessible connection structure includes a second electrical connector member coupled to said cursor control circuitry and positioned to be matingly engaged by the selected pointing device module in response to operative connection thereof to said base housing.

23. The portable computer of claim 18 wherein:
one of said pointing device modules has a pointing stick member thereon, and
said base housing has a top side wall through which said pointing stick member upwardly projects when said one of said pointing device modules is operatively connected to said base housing.

24. A portable computer comprising:
a base housing;
a lid housing pivotally secured to said base housing and having a screen thereon;
cursor control circuitry;
connection structure associated with said base housing and operative to releasably and interchangeably support thereon, in an operatively coupled relationship with said cursor control circuitry, a selectively variable one of a plurality of different types of pointing device modules each operative by a user of said portable computer to controllably reposition said movable cursor on said screen; and
a plurality of different types of pointing device modules interchangeably supportable by said connection structure,
each of said pointing device modules having opposite outwardly projecting side portions, and said connection structure including a cutout area formed in an exterior wall portion of said base housing and having spaced apart opposite wall sections with parallel grooves formed therein and configured to removably receive the opposite side portions of the selected pointing device module.

25. The portable computer of claim 24 wherein each of said pointing device modules has an opposite pair of spring-loaded detent members operative to be releasably snapped into said grooves.

26. The portable computer of claim 25 wherein each of said pointing device modules further has a release member mounted thereon and operative to selectively retract said detent members.

27. A portable computer comprising:
a base housing;
a lid housing pivotally secured to said base housing and having a screen thereon;
cursor control circuitry;
connection structure associated with said base housing and operative to releasably and interchangeably support thereon, in an operatively coupled relationship with said cursor control circuitry, a selectively variable one of a plurality of different types of pointing device modules each operative by a user of said portable computer to controllably reposition said movable cursor on said screen; and
a plurality of different types of pointing device modules interchangeably supportable by said connection structure,
one of said pointing device modules having a touchpad structure and a closure plug thereon, and
said base housing having a top side wall within which said closure plug is received when said one of said pointing device modules operatively connected to said base housing.

28. A pointing device module releasably attachable to the base housing of a portable computer, comprising:
a body portion having a side surface and an opposite pair of side edges;
a pair of mounting pins projecting outwardly from said side edges;
a pair of resiliently supported retractable detent members projecting outwardly from said opposite side edge in a spaced relationship with said mounting pins; and
an electrical connector carried on said side surface.

29. The pointing device module of claim 28 further comprising a release member carried on said body portion and being operable to selectively retract said detent members.

30. The pointing device module of claim 28 further comprising a pair of pick buttons operably mounted on said body portion.

31. The pointing device module of claim 28 further comprising a pointing stick member projecting outwardly from said side surface.

32. The pointing device module of claim 28 further comprising a touchpad structure operatively mounted on said body portion.

33. A method of constructing a portable computer comprising the steps of:
providing a screen on which a movable image may be displayed;
positioning the screen on a housing structure having an externally accessible connection portion operative to releasably and interchangeably support a selectively variable one of a plurality of different types of pointing device modules each operative by a user of said portable computer to controllably reposition the image on said screen;

providing a plurality of different types of pointing device modules; and using said externally accessible connection portion to releasably secure a selected one of said plurality of different types of pointing device modules to said housing structure.

34. The method of claim 33 wherein said step of providing a plurality of different types of pointing device modules includes the steps of providing a pointing stick module and providing a touchpad module.

35. The method of claim 33 wherein:

said externally accessible connection portion includes a cutout area formed in an exterior wall section of said housing structure, and said using step includes the step of inserting the selected pointing device module into said cutout area.

36. A method of constructing a portable computer comprising the steps of:

providing a screen on which a movable image may be displayed;

positioning the screen on a housing structure having a connection portion operative to releasably and interchangeably support a selectively variable one of a plurality of different types of pointing device modules each operative by a user of said portable computer to controllably reposition the image on said screen, said connection portion including a cutout area formed in an exterior wall section of said housing structure;

providing a plurality of different types of pointing device modules; and using said connection portion to releasably secure a selected one of said plurality of different types of pointing device modules to said housing structure, said using step including the step of inserting the selected pointing device module into said cutout area, said cutout area having a spaced pair of wall areas therein, and said using step further including the steps of:

tilting the selected pointing device module in a first direction before inserting it into said cutout area, and tilting the selected pointing device module in a second direction opposite said first direction after inserting the selected pointing device module into said cutout area to responsively cause the inserted pointing device module to removably latch into place within said cutout area.

37. The method of claim 36 wherein:

said housing structure has a first electrical connector therein, each pointing device module has a second electrical connector thereon, and said using step further includes the step of causing the mating engagement of said first electrical connector with the second electrical connector of the selected pointing device module in response to performing said step of tilting the selected pointing device module in said second direction.

38. The method of claim 37 further comprising the step of inserting a computer component into said cutout area, in an underlying supporting relationship with the selected pointing device module, after performing said step of tilting the selected pointing device module in said second direction.

39. The method of claim 38 wherein said step of inserting a computer component is performed using a hard disk drive tray structure.

* * * * *